(12) United States Patent
Walsh

(10) Patent No.: US 9,731,376 B2
(45) Date of Patent: Aug. 15, 2017

(54) SYSTEM AND METHOD FOR PLASMA CUTTING SHEET METAL IN AN AUTOMATED COIL-LINE MACHINE

(71) Applicant: Plasma Automation Inc., Bohemia, NY (US)

(72) Inventor: Matthew Walsh, Bohemia, NY (US)

(73) Assignee: PLASMA AUTOMATION INC., Bohemia, NY (US)

( * ) Notice: Subject to any disclaimer, the term of this patent is extended or adjusted under 35 U.S.C. 154(b) by 0 days.

(21) Appl. No.: 15/184,529

(22) Filed: Jun. 16, 2016

(65) Prior Publication Data

US 2016/0297027 A1    Oct. 13, 2016

Related U.S. Application Data

(63) Continuation of application No. 14/163,764, filed on Jan. 24, 2014, now Pat. No. 9,393,638.

(Continued)

(51) Int. Cl.
| | |
|---|---|
| B23K 10/00 | (2006.01) |
| B23K 37/04 | (2006.01) |
| B23K 37/02 | (2006.01) |
| B23K 26/08 | (2014.01) |
| B23K 26/38 | (2014.01) |
| B23K 26/40 | (2014.01) |
| B23K 101/16 | (2006.01) |

(Continued)

(52) U.S. Cl.
CPC .......... *B23K 10/00* (2013.01); *B23K 26/0869* (2013.01); *B23K 26/38* (2013.01); *B23K 26/40* (2013.01); *B23K 37/0235* (2013.01); *B23K 37/0408* (2013.01); *B23K 2201/16* (2013.01); *B23K 2201/34* (2013.01); *B23K 2201/35* (2015.10); *B23K 2203/50* (2015.10)

(58) Field of Classification Search
CPC .... B23K 10/00; B23K 26/0869; B23K 26/38; B23K 26/40; B23K 37/0235; B23K 37/0408; B23K 2201/035; B23K 2201/0408; B23K 2003/50; B23K 2201/016; B23K 2201/34; H05H 1/34; H05H 1/26
USPC ............ 219/121.39, 121.45, 121.48, 121.58, 219/121.67
See application file for complete search history.

(56) References Cited

U.S. PATENT DOCUMENTS

| | | | |
|---|---|---|---|
| 8,436,272 B2 * | 5/2013 | Schiebout | .............. B65H 19/00 219/121.6 |
| 9,393,638 B2 * | 7/2016 | Walsh | ................ B23K 37/0235 |

(Continued)

OTHER PUBLICATIONS

"Building insulation," http://en.wikipedia.org/wiki/Building_insulation, printed on Dec. 13, 2012, 7 pages.

(Continued)

*Primary Examiner* — Mark Paschall
(74) *Attorney, Agent, or Firm* — Lewis Rice LLC

(57) ABSTRACT

A fully automated plasma sheet metal cutter that can be integrated into a HVAC coil-line and which increases the precision of cutting, decreases the time it takes to cut a particular component sheet metal part, and offers flexibility in cutting different sized and shaped holes or openings. Further, since the system is fully automated, it eliminates the error or cost attributed to a portion of the cutting process that heretofore has been associated with a manual laborer.

4 Claims, 4 Drawing Sheets

Related U.S. Application Data

(60) Provisional application No. 61/756,701, filed on Jan. 25, 2013, provisional application No. 61/778,596, filed on Mar. 13, 2013.

(51) Int. Cl.
  *B23K 101/34* (2006.01)
  *B23K 103/00* (2006.01)

(56) References Cited

U.S. PATENT DOCUMENTS

| | | |
|---|---|---|
| 2001/0033782 A1 | 10/2001 | Conley |
| 2002/0084259 A1* | 7/2002 | Bertuzzi ............... B23K 10/00 219/121.39 |
| 2004/0143954 A1 | 7/2004 | Walsh |
| 2007/0241083 A1 | 10/2007 | Yamaguchi et al. |
| 2010/0301020 A1 | 12/2010 | Phillip et al. |
| 2012/0186316 A1 | 7/2012 | Baker et al. |
| 2012/0187091 A1 | 7/2012 | Grzyb et al. |
| 2014/0197146 A1 | 7/2014 | Forlong |

OTHER PUBLICATIONS

"Duct (HVAC)," http://en.wikipedia.org/wiki/Duct_(HVAC), printed on Dec. 14, 2012, 6 pages.
"Duct Sealing", U.S. Environmental Protection Agency, 430F-09-050, Feb. 2009, 5 pages.
"Duct insulation," http://www.insulation4less.com/Insulation4lessTechnicalArticles-35-Duct-Insulation.aspx, printed on Dec. 14, 2012, 4 pages.
"Duct Sealing," http://www.energystar.gov/index.cfm?c=home_improvement.hm_improvement_ducts, printed on Dec. 14, 2012, 1 page.
"Ductmate: PolyArmor Tools", http://www.ductmate.com/product.aspx?id=146, printed on Dec. 13, 2012, 2 pages.
"Ductmate: PolyArmor Tools", http://www.ductmate.com/product.aspx?id=149, printed on Dec. 13, 2012, 2 pages.
"Insulated Duct Cleaning and Maintenance," http://www.naima.org/insulation-knowledge-base/duct-hvac-insulation/insulated-duct-cleaning-and-maintenance.html, printed on Dec. 13, 2012, 3 pages.
"Duct Sealing and Insulation," http://www.energysavvy.com/topics/duct-sealing-and-insulation/, printed on Dec. 13, 2012, 4 pages.
"DIY: How to Insulate Ductwork," http://voices.yahoo.com/diy-insulate-ductwork-4650291.html, printed on Dec. 13, 2012, 3 pages.
"Ductmate Poly Armor Polyester Duct Liner," Ductmate Green Products, Issue 652, May 2012, www.ductmate.com, 4 pages.
Eastman Cardinal 534 Round Knife Cutting Machine 4"," https://www.rfsupply.com/product/21, printed on Dec. 13, 2012, 5 pages.
Material Safety Data Sheet for Poly Armor, Ductmate Industries, Inc., Issued on Mar. 19, 2012, 2 pages.
"Little Giant," Eastman Machine Co., http://www.eastmancuts.com/little-giant, printed on Dec. 14, 2012, 2 pages.
"HVAC Cutting Systems," Plasma Automation Inc., Vicon Machinery LLC, www.plasma-automation.com, 15 pages.
"Plasma cutting," http://en.wikipedia.org/wiki/Plasma_cutting, printed on Dec. 19, 2012, 3 pages.
"Laser cutting," http://web.archive.org/web/20121115035544/http://en.wikipedia.org/wiki/Laser_cutting, printed on Dec. 9, 2014, 9 pages.

* cited by examiner

SYSTEM AND METHOD FOR PLASMA CUTTING SHEET METAL IN AN AUTOMATED COIL-LINE MACHINE

CROSS REFERENCE TO RELATED APPLICATION(S)

This application is a Continuation of U.S. Utility patent application Ser. No. 14/163,764, filed Jan. 24, 2014 and currently pending, which claims benefit of U.S. Provisional Application Ser. No. 61/756,701 filed Jan. 25, 2013 and U.S. Provisional Application Ser. No. 61/778,596, filed Mar. 13, 2013, both now expired. The entire disclosure of all the above documents is herein incorporated by reference.

BACKGROUND OF THE INVENTION

1. Field of the Invention

This disclosure is related to the field of metal cutting machines. More specifically, the present disclosure relates to systems, devices, methods and processes for cutting shapes into sheet metal for ductwork as part of a coil-line manufacturing system.

2. Description of the Related Art

Ductwork is a central component of forced-air heating and cooling systems. In building structures with forced-air heating and cooling systems, ducts are used to distribute air throughout the structure. Stated differently, air ducts are the throughways through which treated air from heating or conditioning equipment in forced-air systems is distributed throughout the building structure.

Air ductwork is usually constructed out of thin metal sheets. Galvanized mild steel is the standard and most common material used in fabricating ductwork. Generally, ductwork construction starts with cutting and forming these thin metal sheets into component subparts in a manufacturing facility, attaching an insulative material known to those of ordinary skill in the art to one side of the thin metal sheets (if the sheets are to be insulated), transporting the finished ductwork component parts to the building structure, and constructing the air ductwork throughways on-site at the building structure.

Currently, plasma cutting is one of the methodologies most commonly utilized to cut the thin metal sheets into the desired component parts when fabricating ductwork. Generally, plasma cutting is a process that is used to cut steel and other materials of different thickness with a plasma torch. In the plasma cutting process, an inert gas (such as compressed air) is blown at high speeds out of a nozzle. At the same time, an electric arc is formed through the gas from the nozzle to the cutting surface, turning some of that gas into plasma. Generally, the plasma is sufficiently hot to melt the metal being cut and moves sufficiently fast to blow molten metal away from the cut.

Generally, there are two main types of plasma cutting tools. As would be understood by those of ordinary skill in the art, an HF plasma cutting tool uses a high-frequency, high-voltage spark to ionize the air through the torch head and initiate an arc. Accordingly, the torch does not need to be in contact with the raw material to be cut when starting. The other type of plasma cutting machine, a pilot arc, uses a two cycle approach to producing plasma, also avoiding the need for initial contact. In the pilot arc machine, a high-voltage, low current circuit is used to initialize a very small high-intensity spark within the torch body, thereby generating a small pocket of plasma gas which is called the pilot arc. The pilot arc has a return path built into the torch head. The pilot are will remain within itself until it ignites the main plasma are.

In industrial cutting settings, a plasma cutter can be utilized by hand. However it is more common for the process to be automated. In both of these methodologies, a cutting table is utilized. The raw material to be cut with the plasma cutting machine—in the case of duct work, sheet metal-is placed onto a machine table, a large flat surface, and located to stops on the table and held in place. The table is generally sized to the size of the sheet metal used. The most ubiquitous plasma cutting methodology in the prior art are CNC cutting tables. In the CNC cutting table methodology, a computer controls the torch head, producing clean, sharp cuts in the desired programmed pattern.

Notably, during this entire process the sheet metal is held rigidly to the table and the material used is generally a sheet of confined size. Generally, the sheet metal is not manipulated in these prior art processes because it adds an additional degree of complexity to the cutting process. Instead, in these processes, the sheet metal is held stationary while the plasma cutter is manipulated on a carriage and gantry moveable in the X and Y axes. CNC plasma cutter and cutting tables have a wide use in the HVAC industry as the cutter of choice for the component parts of ductwork fittings (that is components that are not simply straight) such as offsets, elbows and transitions. Plasma cutters also are commonly used to form cutouts within other ductwork structures such as to allow for the connection of two ducts at angles and for input and output holes.

While the utilization of plasma cutters, and CNC plasma cutting methodologies in particular, has increased productivity in the HVAC industry since its introduction in the early 1980s, there are still numerous drawbacks with both this and the manual methodology. The first problem is a lack of precision and improper cuts. In the manual method, the reason for this lack of precision is simply basic human error. There also can be over or under correcting as a user of a plasma cutter manually attempts to follow a marked pattern. In the automated method when producing full length straight ducts, the ducts generally must be smaller than the sheet it is made from in order to allow for cutting and positioning of the cutter over the sheet. This produces a necessary amount of waste material. Additionally, the construction of the ductwork will require additional forming operations to be completed manually as the cutting process can generally only take place on sheet metal which is flat and has not been folded into the 3-dimensional duct shape.

Another problem with existing methodologies is cost. Specifically, in the manual method, the cost of the laborer who is manipulating the plasma cutter must be included in the overhead cost for the ductwork. The cost of the laborer must also be considered in the automated methods where an additional manual secondary operation step (such as final finishing of the ductwork) must be performed.

Another problem, closely related to cost, is time. The manual process, in addition to the cost of labor, is also time intensive. Moreover, the automated CNC plasma cutting process, while faster than the manual methodologies, is not sufficiently fast enough for many manufacturing facilities due, in part, to the additional final finishing steps which are performed manually and the need to transfer parts to and from the cutting table. Notably, even the most advanced currently utilized automated CNC plasma cutting methodologies are not fully automated. In many of these systems, a user is still required to manually locate positions required to complete the cutting.

In addition, neither of these methodologies is traditionally utilized in HVAC coil-lines. HVAC coil-lines are ubiquitous in the HVAC industry and, generally, offer a complete integration of processing metal for ductwork up to the point where connection accessories are utilized in the field to assemble the ductwork. Generally, coil-lines offer the fastest methodology for making straight ductwork, offer a more accurate ductwork manufacturing process, and reduce material waste and operating costs while producing a superior product. Coil-lines generally comprise a standard number of pieces for cutting, bending, transporting, and otherwise manipulating the coil of material which are tied together by a controller and conveyor belt or roller system for advancing the coil material through the coil line.

Generally, when making straight ductwork on a coil-line it is common for a manufacturer to maximize cost efficiency by utilizing a lighter gauge of metal to lower the cost of the material components of the ductwork. To compensate for the decrease in stability and strength associated with the lower gauge metal, a reinforcement system is generally used in ductwork to achieve the stability lost by utilizing the lighter gauge sheet metal.

One commonly used methodology for reinforcing ductwork is a tie rod-based system. Commonly, these tie rod-based systems require different sized holes in the ductwork for bolts, tie rods and dampers of varying sizes to be connected. In currently utilized coil-lines, the required holes for ductwork reinforcement systems are generally achieved through an automated punching methodology integrated into the coil-line. These are generally mechanical die punches which are simply dropped onto the coil material to form a hole corresponding to the size of the die head.

However, there are numerous problems with this methodology. First, the automated punching methodology is generally only able to punch a single-sized circular hole in the sheet metal with each die head. If a different sized hole is desired, the head of the automated punching system must be switched out. This requires a stoppage of the coil-line and a resulting loss in efficiency. To compensate for this inefficiency, one current general practice in the art is to simply punch holes that correspond to the largest required hole and compensate with washers or similar type of devices where required. Obviously, this arrangement is less than ideal and, at these points, creates possible areas of weakness or leakage in the ductwork.

Further, the automated punching methodology utilized in coil-line systems is generally unable to create holes of different shapes; e.g., square or triangular holes, or particularly large holes such as can be necessary for interconnecting duct pieces with each other. Instead, if these holes are desired, they currently have to be created in a secondary post coil-line step manually or through using a plasma cutting table methodology such as those described previously. This has obvious negative ramifications on efficiency.

In addition, it is often common to place accessory holes or openings (e.g., an access door) or openings for branches and sub-branches in ductwork. Generally, this is accomplished by cutting holes in the ductwork for the door, branch or sub-branch. As this is often performed after the duct is assembled, this step often requires manual cutting and all the attendant problems and inefficiencies.

Currently, cutting of internal structures such as large holes or cut-outs is not a step that can be achieved in the coil-line process. Further, generally odd shapes which may require curved cuts or cuts at uncommon angles can generally not be performed in the coil line as the mechanical punches and guillotine cutters which are particularly useful for performing a large number of repeated cutting operations are unable to make any form of unique or specialized cut. Accordingly, it is generally performed in a secondary manual step in the shop or in the field utilizing a plasma cutting machine or metal cutting scissors.

These later cutting stages can be restricted by the size of the table for the plasma cutter, as would be understood by those of ordinary skill in the art, limiting the shapes of ductwork which may be created. Again, this secondary step also increases the cost, labor and complexity associated with manufacturing ductwork.

While straight line ductwork can be manufactured on an automated plasma cutting machine without the use of a coil-line and this methodology provides a mechanism in which holes and openings can be created in the ductwork, as noted previously, this method of manufacturing has numerous inefficiencies. For example, this process generally only produces a blank without end treatments which can be mechanically generated quickly and efficiently in coil line operations. Further, the finished ductwork product is formed in a batch as opposed to continuous process. Thus, all the additional work that can be automated on a coil-line machine (e.g., forming and bending, notching and shearing) must be done manually in a post-cutting step in the shop or in the field. Further, as the table requires a precut sheet with both dimensions dictated by the size of the table, certain shapes and cut components may be impossible, complicated, or particularly wasteful of material to form. Accordingly, there is a need in the art for a system and device for cutting a variety of shapes in the sheet metal that can be integrated into a coil-line.

SUMMARY OF THE INVENTION

The following is a summary of the invention, which should provide to the reader a basic understanding of some aspects of the invention. This summary is not intended to identify critical elements of the invention or in any way to delineate the scope of the invention. The sole purpose of this summary is to present in simplified text some aspects of the invention as a prelude to the more detailed description presented below.

Because of these and other problems in the art, described herein, among other things, is a methodology of plasma cutting sheet metal in an automated coil-line machine for cutting the sheet metal component parts of ductwork for HVAC systems.

More specifically, disclosed herein is a fully automated plasma sheet metal cutter that can be integrated into a HVAC coil-line and which increases the precision of cutting, decreases the time it takes to cut a particular component sheet metal part, and offers flexibility in cutting different sized and shaped holes or openings. Further, since this system is fully automated, it eliminates the error or cost attributed to a portion of the cutting process that heretofore has been associated with a manual laborer.

There is disclosed herein, in an embodiment, a coil line for the cutting of ductwork in an automated fashion, the coil line comprising: a frame; drive rolls mounted to the frame and configured to unroll a material from a coil; and a cutting assembly mounted to the frame, the cutting assembly including; a gantry arranged across the material in the coil line after it is unrolled from the coil; a table, the table arranged below the material in the coil line after it is unrolled from the coil; a carriage, the carriage configured to move along the gantry only in a direction generally perpendicular to the motion of the material; and a cutter, the cutter located on the carriage and configured to cut the material on the table; wherein, when the cutter cuts the material after it is unrolled from the coil, the cut formed by the combination of: motion of the carriage along the gantry; and motion of the material across the table.

In an embodiment of the coil line, the cut is formed by motion of the carriage in two opposing directions.

In an embodiment of the coil line, the cut is formed by motion of the carriage in two opposing directions and the material in two opposing directions.

In an embodiment of the coil line, the cut is formed by motion of the material in two opposing directions.

In an embodiment of the coil line, the material comprises a metal, such as, but not limited to, galvanized mild steel.

In an embodiment of the coil line, the cutter comprises a plasma cutter.

DETAILED DESCRIPTION OF THE PREFERRED EMBODIMENT(S)

Figure 1:
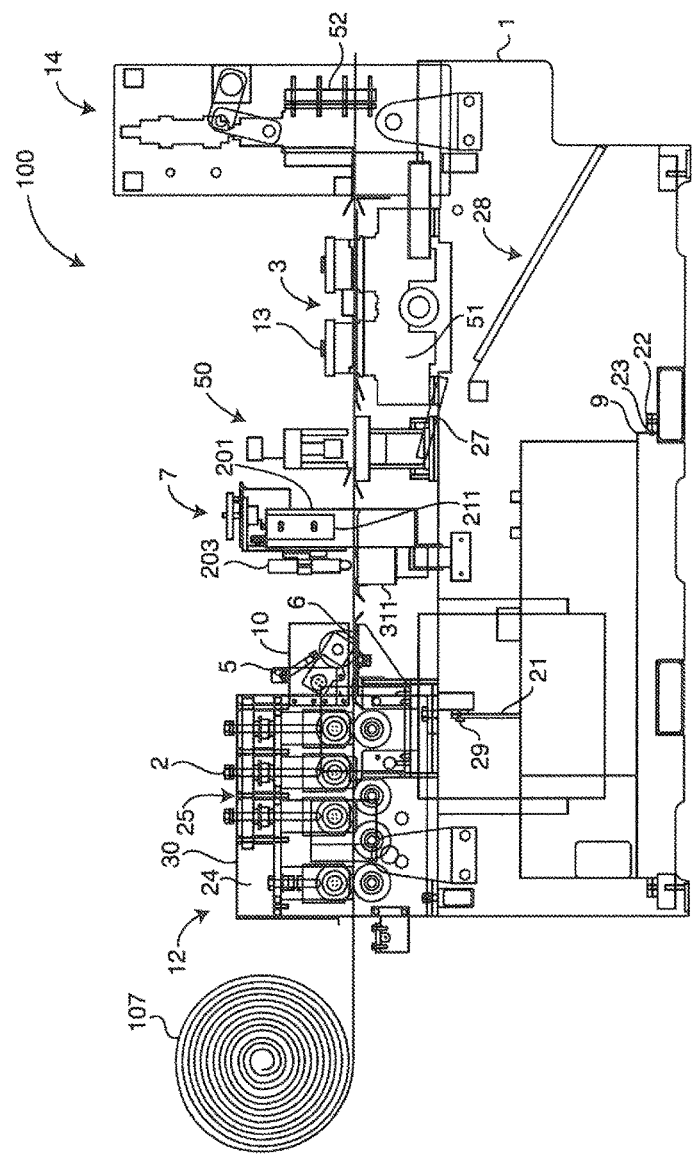
FIG. 1 provides a side assembly view of an embodiment of an automated coil-line machine including a plasma cutting assembly.

In certain preferred embodiments described further herein, a plasma sheet metal cutter, or other cutting tool, will be part of an automated coil-line machine apparatus known to those of ordinary skill in the art for the manufacturing of air ductwork. FIG. 1 provides an embodiment of such a coil line machine (100). Specifically, in the present embodiments, in contrast to the plasma cutters of the prior art which are stand-alone apparatuses, a fully automated cutter is integrated into an automated coil-line machine (100) that acts within an assembly line such that the coil material (107) sheet metal can travel down a conveying or rolling apparatus to the cutting apparatus (7), be cut by the cutter (203) while still on the conveying apparatus and as part of the coil line (100), and then continue down the conveying apparatus to receive any further modification, alteration or construction deemed necessary for the construction of the ductwork. Accordingly, also described herein is a coil-line (100) system that integrates a cutting apparatus (7).

Thus, the devices, as described herein, are contemplated for use, in certain embodiments, with a conveyor or roller assembly coil-line (100) system (or other similar system known to those of ordinary skill in the art) for the production of sheet ductwork. In one embodiment, this coil-line (100) system will generally include the following elements, arranged as depicted in FIG. 1: a frame (1), a roll straightener gear driven with beading (2) which serves to remove the coil material from the coil and generally form it into a continuous flat sheet; a notching assembly (3); a shear assembly (4); an encoder bracket assembly (5); a material support table assembly (6); a hydraulic power unit (9); a guard encoder and bracket (10); a hood 4-roll straightener (12); a pneumatic schematic notch die shift (13): a shear guard (14); a mount plate—bulkhead fitting (21); a welt pad, power unit, front end (22); a bolt pad, power unit, front end (23); a guard, leveler, front end, op side (24); a guard, leveler, front end, guide side (25); a slug chute and notcher assembly (27)(28); a bar nut (29); and a filler plate straightener hood (30). In some embodiments it is contemplated that the coil-line (100) will also include a punching mechanism (50) known to those of ordinary skill in the art for punching tie rod holes of a fixed size. However, this is not essential as the cutting apparatus (7) may render its function superfluous.

In an embodiment disclosed herein, the coil line (100) includes a cutting apparatus (7) which is integrated into a coil-line (100). In the embodiment depicted in FIG. 1, the cutting apparatus (7) is located directly in front of the hole punching mechanism (50) (which punches tie rod and damper holes of a standard or predetermined size), the notchers (51) (which place end notches on the sheet metal ductwork) and the shear (52) (which cuts the ductwork into component parts via a guillotine or similar cut). It should the understood that the sheet metal product produced by this coil-line (100) which integrates the cutting apparatus (7) is superior to the systems and devices of the prior art because it creates a final sheet metal product completely cut, sheered, notched and fitted, such that little to no post-assembly line manufacture or manipulation is required.

The cutting apparatus (7) in this integrated coil-line (100) allows for the manufacture of finished sheet metal in an assembly line, including, for example, the cutting of different size tie rod holes without switching out the hole punching mechanism (50), the cutting of accessory holes or openings or other internal cut-outs or structures, and the cutting of specialty shapes (such as, but not limited to, corners) from the coil material (107). Specifically, the hole punching mechanism (50) can be set at the smallest or most common hole size with any other holes being cut by the cutting apparatus (7). This generally eliminates the need for washers in the resultant ductwork. Thus, this coil-line (100) with an integrated cutting apparatus (7) allows for complete integration of the processing of metal ductwork up to the point where connection accessories are used in the field to assemble the ductwork.

With this integrated coil-line (100), no manual post-cutting step is needed to form, bend, notch and sheer the sheet metal as those steps are performed in the same manner as in a coil line of the prior art. Furthermore, it also allows for the efficient cutting of shapes of multiple sizes from the coil of sheet metal (107) without the restriction of size inherent in the plasma cutting tables of the prior art. In the prior art of automated cutting machines which utilized a cutting table, the shapes which could be cut into the sheet metal were limited by the size of sheet metal which could fit onto the table. For example, if the table could only hold an 8'×10' sheet, the plasma cutter was limited to cutting shapes within these dimensions. With the plasma cutting apparatus (7) integrated into the coil-line (100), there is no longer a restriction in cutting to the size of the sheet metal because the sheet metal is in a continuous coil (107). Further, the use of a continuous coil (107) reduces waste from fixed size sheets that may not conform to part sizes reducing material use and cost.

Figure 2:
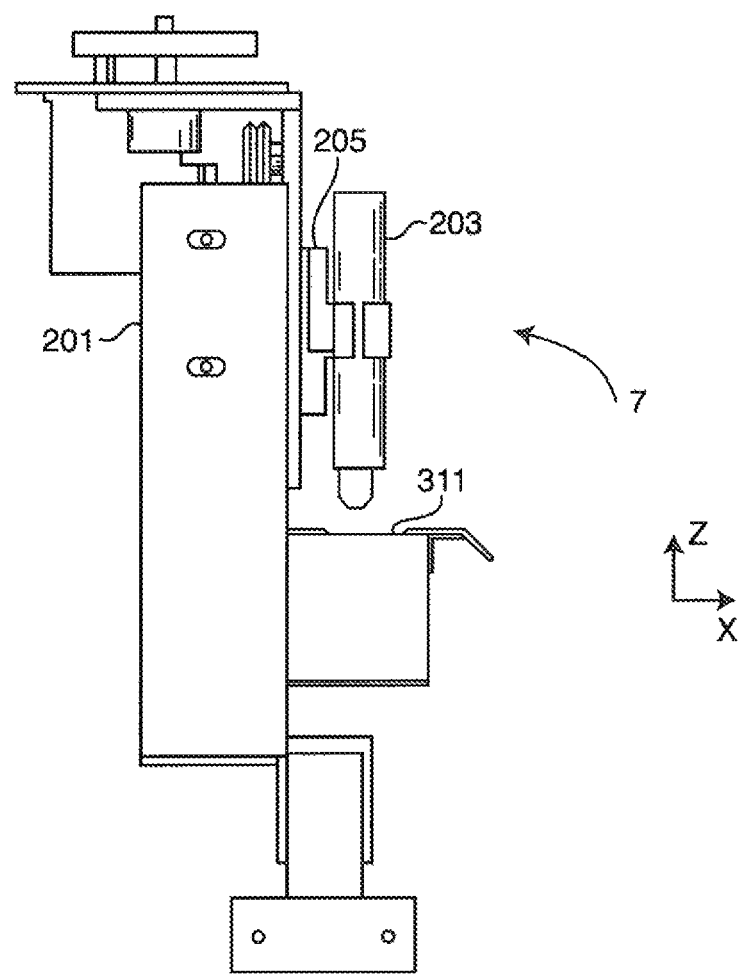
FIG. 2 provides a side view of an embodiment of a cutting assembly of an automated coil-line machine.
Figure 3:
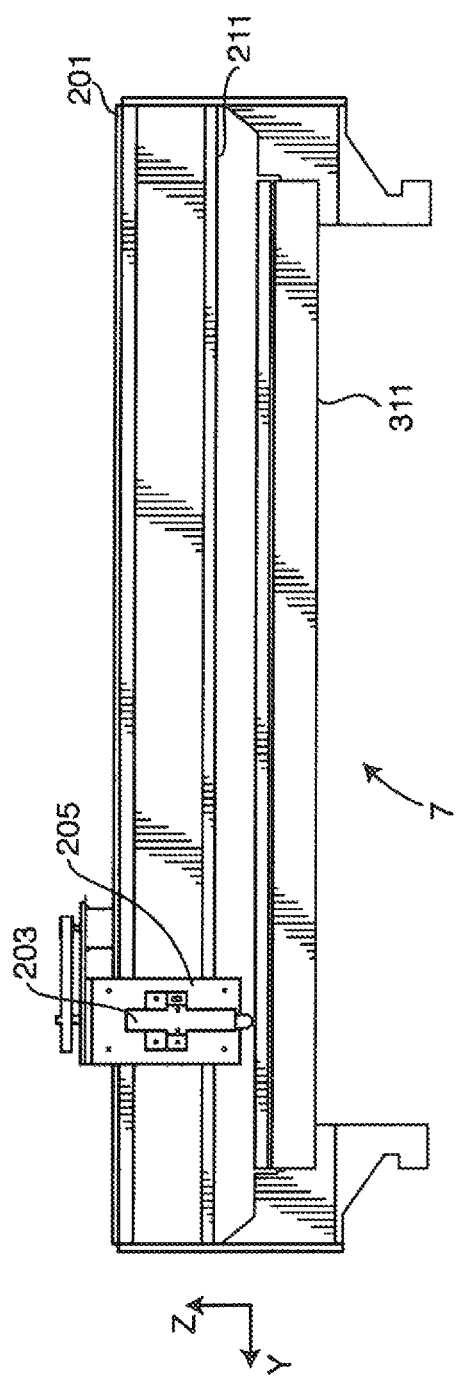
FIG. 3 provides a front view of the embodiment of the cutting assembly of FIG. 2.
Figure 4:
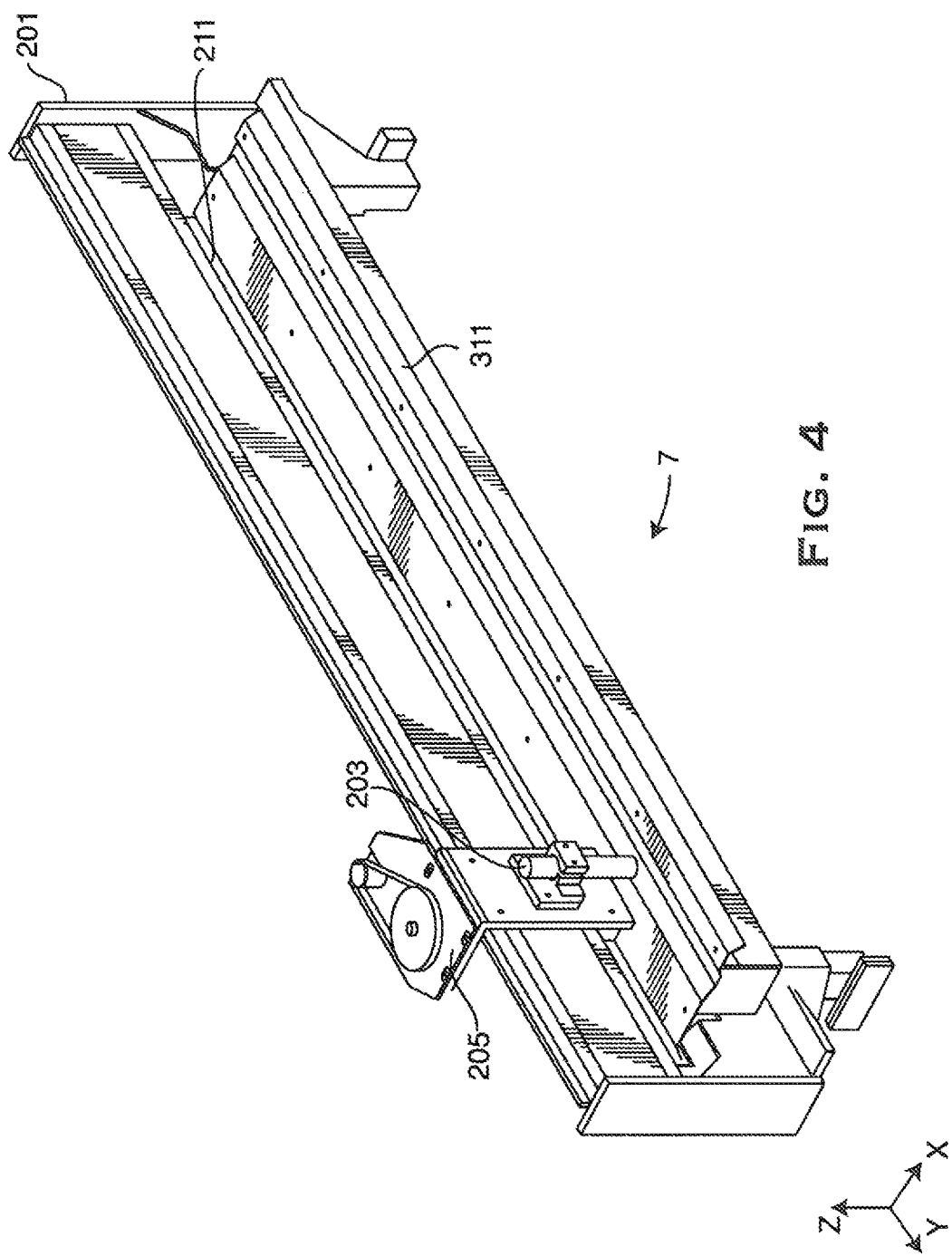
FIG. 4 provides a side perspective view of the embodiment of the cutting assembly of FIG. 2.

Generally, the cutting apparatus (7) utilized in the coil-line (100) will comprise a cutter or tool (203) known to those of ordinary skill in the art. As a preliminary matter, it is also noted that the cutting, manufacturing, configuration, systems and apparatuses described herein will be referred to and described generally in the manner in which the cutter (203) and the raw material sheet metal (107) is manipulated relative to each other. For each of the systems, processes and devices described herein, the axes of motion of the cutting head of the cutter (203) will be designated as the Y axis as shown in FIGS. 2-4. Further, the axes of motion of the sheet metal coil (107) on the coil-line (100) will be designated as the X axis as shown in FIGS. 2-4. Thus, the motion of the cutter (203) head is generally perpendicular to the motion of the coil material (107) through the coil line (100).

In addition, it is noted that the term "cutting apparatus," (7) as used herein, should not be limited to only include plasma-based cutting apparatuses. While plasma cutting is expected to be the preferred cutting method for a variety of reasons, and the cutter (203) will generally be a plasma cutting tool, any cutter or cutting methodology known to those of ordinary skill in the art which can create a precise cut in sheet metal such as, but not limited to, laser, router, and water jet cutters is contemplated as a possible cutting apparatus (7) in the disclosed systems, devices and methods.

In general, in the system, method and device for cutting sheet metal described herein, both the cutter (203) and the raw sheet metal (107) on the coil-line (100) will be manipulated via an automated system known to those of ordinary skill in the art to achieve cut-out component ductwork parts of the desired dimensions. In an embodiment, this can be a standard CNC control system which is configured to operate in the coil line (100) in accordance with the methods discussed herein. In these systems, methods and devices, the raw sheet metal material (107) on the coil-line (100), in certain embodiments, will generally be moved by the roll straightener gear (2) of the coil-line (100), as depicted in FIG. 1.

Notably, unlike the automated CNC plasma cutting methodologies of the prior art that move the plasma torch in the X and Y axes simultaneously over the sheet metal using a carriage arm and circular interpolation by computer control while the sheet metal to be cut remains affixed to the table and stationary, in the disclosed methodology the sheet metal material (107) will be manipulated in the X axis by the coil-line (100), for example, by having the sheet metal coil rotate in both directions by allowing reversal of the drive rolls (2), and/or by having the table (311) under the sheet metal (107) grasp the metal and move it forward and backward, while the cutter (203) will move in the Y axis using circular interpolation by computer control.

Thus, in these systems, methods and devices, the cutter (203) will be manipulated and move along the Y axis (and in certain contemplated embodiments the Z axis to allow for the tool (203) to be cleared from the material (107) when cutting is not needed) during the cutting process. In an embodiment, the cutter (203) is actually confined to the single Y-axis which can both provide for a more rigid structure and can provide for easier construction. FIGS. 2-4 provide various views of a gantry (201) for the plasma cutter (203) upon which a carriage (205) can be manipulated to move along the Y axis (in addition to the Z axis in certain contemplated embodiments). The gantry (201) can be affixed in position over the coil material (107) on the coil line (100) with the gantry (201) being configured to stretch from one side of the coil (107) to another and with the coil (107) passing under the bottom side (211) of the gantry (201) and over the table (311) to which the gantry (201) is affixed.

In an embodiment, it is contemplated that this movement along the Y axis will be accomplished via a carriage system (205) known to those of ordinary skill in the art where the carriage can traverse the gantry (201) in any fashion including electromechanical, pneumatic, or hydraulic motors. However, any motive mechanism known to those of ordinary skill in the art for moving a cutter (203) along a single axis is contemplated in this disclosure.

Further, in certain embodiments, it is contemplated that the cutter (203) can be manipulated in the Y axis by associated controlling software. In other embodiments, it is contemplated that the cutter (203) can be manipulated in both the Y and Z axes. In any of these embodiments, the cutter (203) will have an axis or axes of movement relative to the raw sheet metal coil (107) on the coil-line, while the sheet metal raw coil (107) will move relative to the cutter (203)—i.e., both the raw sheet metal material and the cutter (203) will move relative to each other to achieve the desired cut out shape for the component part of the metal ductwork being cut. In certain embodiments, a software system will control the movement of both the raw sheet metal material and the cutter (203) relative to each other during a cutting event. It should be recognized that the cutting apparatus (7) and specifically the gantry (201) and table (311) will generally be rigidly positioned relative to the remaining components of the coil line (100). Further, the base (211) of the gantry (201) will often be positioned so as to be in relatively close proximity to, or even in contact with, the coil (107) of material.

In one embodiment, the type of cut achieved by the systems, methods and processes disclosed herein will be a complete cut. Stated differently, in these embodiments, after a cutting event, the component ductwork part will be completely detached and separated from the associated raw material sheet metal. The complete cut need not be entirely across the coil (107).

In another preferred embodiment, the cut achieved by the methods, systems and processes disclosed herein will be a stitched cut. In this form of cut, the cutter (203) stitches or outlines the pattern of the desired component part via small cuts along the ultimate primary cut line leaving small amounts of material between each cut. Thus, in this embodiment, the outlines of the ultimate component parts are placed in the raw sheet metal. These outlines are generally not punched out or released from the raw material sheet metal until it leaves the coil-line (100) or until the raw material sheet metal is transported to the ultimate construction site. Thus, this methodology allows ducts with large cutouts internal to the walls of the duct (e.g. to connect other duct components) to still convey through the coil line efficiently and without separating. Another contemplated type of cut for the systems, methods and processes disclosed herein are tie rod holes, damper holes and accessory holes of any shape (e.g., circular, oval, square, rectangular) or size. Yet another contemplated type of cut for the systems, methods and processes disclosed herein are access holes and tap-in holes.

Generally, operation of a coil line (100) including a cutting apparatus (7) will operate as follows. The material of the coil (107) will uncoil in the same manner as is known to those of ordinary skill in the art and be sent into the coil line (100) generally by being engaged by the drive rolls (2). Initially, the coil (107) is fed into the coil line (100) and is moved through the line (100) utilizing a series of grab wheels, belts, or other structures to move the coil material (107) through the coil line (100). Upon the coil material (107) reaching the cutting apparatus (7), the cutter (203) will generally be positioned in a hold position which may be spaced upward (Z-axis) or the side (Y-axis) of the coil material (107). In the event that a standard piece of straight ductwork with no additional structure is being produced, the cutter (203) will remain in the this position and the coil material (107) will pass on to be punched, folded, or otherwise manipulated as known to those of ordinary skill.

When a piece of the coil material (107) becomes positioned just prior to, and/or under the cutting apparatus (7)

which requires a specialized cut, the cutter (203) will move to position over the coil material (107). The cutter (203) will then be manipulated to cut the coil material (107) as the coil material (107) moves under the gantry (201). The exact nature of the movement will depend on the shape to be cut. For example, if the coil material (107) is to be cut lengthwise (down the coil) in a sine wave pattern, the cutter (203) will move in the Y-axis while the coil material (107) moves underneath the gantry (201) in the X axis. As should be apparent, in the this type of cutting arrangement, the coil (107) motion is still the same as it had been previously. The coil material (107) will simply be progressed along the coil line (100) in the same manner it had previously. Depending on the embodiment, it may be necessary to slow the motion of the coil material (107) through the line as the cutter (203) is working, but this is generally dependent on the relative X and Y components of the cut as well as the speed of the cutter (203) and carriage (205).

In the event that the cutout requires a piece to be removed or another type of cut which requires a forward and backward movement (e.g. to cut out a circle or box), the coil line conveyor mechanism (such as drive rolls (2)) will generally assist with the movement. For example, to cut a box, the cutter (203) may contact the coil material (107) and remain stationary in the Y-axis while the coil material (107) progresses a fixed distance under the gantry (201) (X direction). Upon the cutter (203) reaching the point where the corner of the box is to be positioned, the coil line (100) may halt the motion of the coil material (107) along the coil line (100). The cutter (203) may then move across the coil material (107) (Y direction) while the coil material (107) remains stationary (such as by being held in place by the drive rolls (2)) cutting a line generally perpendicular to the prior cut. After the next corner is reached, the coil line (100) may reverse the direction of the coil line (100) operation to return the coil material (107) back the direction it originally came (negative X direction). During this action the cutter (203) may again remain stationary. Upon reaching the last corner, the coil line (100) may again halt and the cutter (203) may traverse back to the position where it originally contacted the coil material (107) (negative Y direction). Upon reaching the starting point, the cutter (203) may be deactivated or raised (Z direction) to stop the cutting.

At this time, the cutout has been completed. In an embodiment, the coil line (100) may then restore the former motion and continue moving the coil material (107) through the coil line (100) (X direction). This will commonly be the case if a stitched pattern is being cut as the cut portion will simply remain as part of the coil material and resultant product. Alternatively, depending on the shape, the cutout portion may be "pushed" by other material of the coil (107) downstream of the table (311) and fall clear of the coil line (100) onto the floor or a collection bin underneath the coil line (100). Alternatively, depending on the nature of the cut portion, the coil line (100) may resume the motion of the coil material (107) in the negative X direction and drop the cutout part off the other (upstream) side of the table (311) and then resume forward motion (X direction) once the cutout part is confirmed to have cleared the coil material (107).

In the event that larger pieces are potentially to be cut by the coil line (100), e.g. a large angled piece, the coil line (100) may include specifically added drive mechanisms, such as wheels or belts, that are part of the table (311) and serve to move cut parts off the table (311). These may then be directed by the coil line (100) to continue through the coil line (100), or may be purposefully diverted from the remaining components of the coil line (100) if action of those components is unnecessary.

The cutting apparatus (7) disclosed herein is an advance over the other plasma cutting systems utilized in the art because it is fully automated, precise, can be used in a coil-line (100) (adding flexibility in cutting tie-rod and accessory holes into a coil-line (100) and the capability of cutting access and branch holes into a coil-line(100)) and, importantly, accomplishes the cut with movement of both the raw coil material (107) and the cutter (203). Notably, one of the advantages of the fully automated plasma cutter described herein is that it allows the cutting of internal shapes in ductwork sheet metal during a coil-line (100) and automated manufacture. For example, in certain embodiments of the cutting apparatus (7) described herein, the cutting apparatus (7) allows cutting of internal shapes and punch outs during assembly of core materials—the punch outs necessary to build a branch or sub-branch "t" connection point as the ductwork is manufactured and assembled.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for the cutting of ductwork in an automated fashion, the method comprising:
   providing a coil line comprising:
      a frame;
      a material being unrolled from a coil by drive rolls mounted to said frame; and
      a cutting assembly mounted to said frame, the cutting assembly including;
         a gantry fixedly attached to said frame and arranged across said unrolled material;
         a table, said table fixedly attached to said frame and arranged below said unrolled material;
         a carriage; and
         a cutter, said cutter located on said carriage;
   cutting said unrolled material by:
      engaging said unrolled material with said cutter; and
      both moving said unrolled material across said table in two opposing directions, and moving said carriage along said gantry in two opposing directions generally perpendicular to both said two opposing directions said unrolled material is moving across said table;
      without disengaging said cutter from said material.

2. The method of claim 1 wherein said material comprises a metal.

3. The method of claim 2 wherein said metal comprises galvanized mild steel.

4. The method of claim 1 wherein said cutter comprises a plasma cutter.

* * * * *